UNITED STATES PATENT OFFICE.

TEOFRON BOBERG, OF LONDON, ENGLAND, ASSIGNOR TO TECHNO-CHEMICAL LABORATORIES LIMITED, OF LONDON, ENGLAND.

METHOD OF MAKING SODIUM FERROCYANID.

1,318,258.  Specification of Letters Patent.  Patented Oct. 7, 1919.

No Drawing.  Application filed April 27, 1917.  Serial No. 164,966.

*To all whom it may concern:*

Be it known that I, TEOFRON BOBERG, a subject of the King of Sweden, residing at "Fairlawn," Clarence Road, Clapham Park, London, S. W., England, have invented a certain new and useful Improved Method of Making Sodium Ferrocyanid, of which the following is a specification.

This invention relates to the formation of sodium ferrocyanid crystals.

The object of the invention is to provide a simple and inexpensive method of obtaining such crystals in a substantially pure form.

The invention consists in a method of obtaining crystals from a solution containing mainly sodium ferrocyanid and sodium carbonate, according to which the liquid is evaporated at, say, 80° C. to the point of crystallization and is then slowly cooled with the resulting separation of substantially pure ferrocyanid crystals down to a temperature of about 35° C. at which temperature the remaining liquor is drawn off before any appreciable separation of sodium carbonate crystals is effected.

The invention further consists in a method as hereinbefore indicated according to which the original solution is formed by suitable treatment of a solution of cyanid, cyanamid and hydroxid of barium by precipitating the barium with a solution of sodium carbonate which is partly obtained by separating the sodium carbonate, together with some further amount of sodium ferrocyanid, as crystals from the liquor drawn off at about 35° C. by further cooling it to any required lower temperature.

The invention further consists in the improvements in methods for obtaining sodium ferrocyanid and other substances as hereinafter described.

In carrying out this invention in one convenient manner, barium carbonate mixed with carbon is in the well-known manner heated in the presence of nitrogen to a yellow or bright red heat with the resulting formation of barium cyanid and barium cyanamid which can be recovered by lixiviating the mass with water. In addition to the above reactions a third reaction resulting in caustication of part of the barium carbonate to oxid takes place.

For the foregoing purpose one part of coke mixed with four parts of barium carbonate, and both finely ground, may be introduced into a retort of suitable material which is heated to a bright red or yellow heat and kept at such temperature for four to six hours while nitrogen is passed through the mass and the current continued while the retort is left to cool.

The reaction mass in one particular instance had approximately the following composition:—

| | |
|---|---|
| Barium cyanid | 25% |
| Barium cyanamid | 3% |
| Barium oxid | 23% |
| Barium carbonate | 35% |
| Carbon | 14% |

After grinding, such a mass may be treated with hot water while stirring, till all soluble matter has gone into solution, the cyanid and cyanamid being soluble without alteration, the oxid being transformed to hydroxid which is also soluble, and the carbonate and the carbon being insoluble.

Sodium carbonate dissolved in water may now be added in an amount sufficient to precipitate all dissolved barium as carbonate. The solution may be separated from the insoluble part in any suitable way and the latter washed and dried. It contains all the barium present in the original mixture and only needs the addition of a certain quantity of ground coke to be available for again absorbing nitrogen, as already described.

The solution containing cyanid, cyanamid and hydrate of sodium may be treated at a temperature of about 80° C. with finely divided metallic iron in order to transform the cyanid to ferrocyanid. When no free cyanid is left the sodium hydrate may be transformed to carbonate by blowing carbon dioxid of any desired purity into the solution which is then evaporated at a temperature at which the ferrocyanid is not unduly affected, say at a temperature of about 80° C. to a condition at which crystallization is just commencing.

If this solution were now cooled to a low temperature it would result in obtaining a mixture of crystals, some of which would be more or less pure sodium carbonate and others more or less pure ferrocyanid, and yet others a mixture of both, *i. e.*, practically no separation would take place.

According to the present invention, in order to obtain fairly pure crystals of ferrocyanid advantage is taken of the fact that sodium carbonate has a maximum solubility in the neighborhood of or normally a degree or two above 35° C., the solubility falling very rapidly as the temperature falls below this point and again very slowly as the temperature rises above it, say from 40° C. to 100° C. In view of this the following improved method is adopted.

After evaporating the solution, say at 80° C., till the sodium carbonate just commences to separate, the solution is left to cool slowly, when it is found that the few crystals of sodium carbonate at first formed will redissolve owing to the solubility of the carbonate increasing slowly with the falling temperature, and in fact no further separation of this salt will take place until the temperature of maximum of solubility normally about 37° C. has been passed. The solubility of the ferrocyanid on the contrary decreases very rapidly as the temperature falls and at some temperature, depending on the percentage of this salt in the solution, it commences to crystallize in a substantially pure condition. As the temperature falls, more and more of the pure ferrocyanid will separate until at about 35° C. the solution is again saturated with carbonate, which will commence to crystallize out in admixture with the ferrocyanid, if the temperature is allowed to fall further.

To carry into effect the improved method of making sodium ferrocyanid the crystallization process is interrupted before the temperature of the solution has fallen to such a degree that the carbonate commences to separate. For this purpose when the temperature of the solution has reached 35° C. or thereabout the mother liquor is drawn off and the crystals washed and dried.

The drawn off liquor may now be cooled to a comparatively low temperature when the bulk of the carbonate separates out in admixture with a considerable amount of ferrocyanid in what may be called the second separation. The product thus obtained is used to precipitate part of the barium in the next operation and its content of ferrocyanid is thus precipitated as barium ferrocyanid which is then reconverted to sodium ferrocyanid by the sodium carbonate added to precipitate the remainder of the barium.

The mother liquor from the sodium carbonate crystallization or second separation which contains the main part of the cyanamid together with carbonate and ferrocyanid and casual impurities introduced through the coke may be treated in any suitable manner, say for recovering the nitrogen as ammonia, and the residue therefrom consisting mainly of sodium carbonate either in liquid or solid form according to the treatment which has been adopted can be used to precipitate another part of the barium in the next operation.

Modifications in the manner of, and materials used for carrying this invention into effect may be introduced without in any way departing from the spirit of the same.

Having now described my invention, what I claim as new and desire to secure by Letters Patent is:—

1. A method of obtaining substantially pure sodium ferrocyanid crystals from a solution containing mainly sodium ferrocyanid and sodium carbonate consisting in evaporating said solution at a temperature not greatly above 80° C. to the point at which sodium carbonate just commences to separate as crystals, slowly cooling the solution to prevent said separation until the temperature of maximum solubility of the sodium carbonate is attained but not greatly passed and drawing off the liquor from the ferrocyanid crystals which have deposited during said cooling.

2. A method of obtaining substantially pure sodium ferrocyanid crystals from a solution containing mainly sodium ferrocyanid and sodium carbonate consisting in evaporating said solution at a temperature not greatly above 80° C. to the point at which sodium carbonate just commences to separate as crystals, slowly cooling the solution to prevent said separation until the temperature of maximum solubility of the sodium carbonate is attained but not greatly passed, say about 35° C., drawing off the liquor from the ferrocyanid crystals which have deposited during said cooling and utilizing said liquor during the preparation of a further quantity of the original solution in precipitating barium from a solution containing barium cyanid, barium cyanamid and barium hydroxid, thus utilizing ferrocyanid which has not been deposited during said cooling.

3. A method of obtaining substantially pure sodium ferrocyanid crystals from a solution containing mainly sodium ferrocyanid and sodium carbonate consisting in evaporating said solution at a temperature not greatly above 80° C. to the point at which sodium carbonate just commences to separate as crystals, slowly cooling the solution to prevent said separation until the temperature of maximum solubility of the sodium carbonate is attained but not greatly passed, drawing off the liquor from the ferrocyanid crystals which have deposited during said cooling, further cooling said drawn-off liquor to deposit crystals of sodium carbonate and more sodium ferrocyanid crystals and utilizing said mixed crystals in the preparation of a further quantity of the original solution, so that said sodium carbonate may precipitate barium from a solution containing barium cyanid, barium cyanamid and barium hydroxid and the ferrocyanid be again utilized in the process.

4. A method of obtaining substantially pure sodium ferrocyanid crystals from a solution containing mainly sodium ferrocyanid and sodium carbonate consisting in evaporating said solution at a temperature not greatly above 80° C. to the point at which sodium carbonate just commences to separate as crystals, slowly cooling the solution to prevent said separation until the temperature of maximum solubility of the sodium carbonate is attained but not greatly passed, drawing off the liquor from the ferrocyanid crystals which have deposited during said cooling, further cooling said liquor while crystals of sodium carbonate and sodium ferrocyanid are deposited, withdrawing the liquid from said crystals and utilizing said crystals and said liquid during the preparation of a further quantity of the original solution in precipitating barium from a solution containing barium cyanid, barium cyanamid and barium hydroxid.

5. A method of obtaining substantially pure sodium ferrocyanid crystals from a solution containing mainly sodium ferrocyanid and sodium carbonate consisting in evaporating said solution at a temperature not greatly above 80° C. to the point at which sodium carbonate just commences to separate as crystals, slowly cooling the solution to prevent said separation until the temperature of maximum solubility of the sodium carbonate is attained but not greatly passed, drawing off the liquor from the ferrocyanid crystals which have deposited during said cooling, further cooling said liquor while crystals of sodium carbonate and sodium ferrocyanid are deposited, withdrawing the liquid from said crystals, treating said liquid to recover nitrogen as ammonia and utilizing the residue consisting mainly of sodium carbonate during the preparation of a further quantity of the original solution in precipitating barium from a solution containing barium cyanid, barium cyanamid and barium hydroxid.

6. A method of obtaining substantially pure sodium ferrocyanid crystals consisting in heating a mixture of barium carbonate and carbon in the presence of nitrogen, recovering barium cyanid, barium cyanamid and barium hydroxid therefrom by lixiviating the mass with water, precipitating barium carbonate by the addition of sodium carbonate dissolved in water, separating the liquid from the mixture, transforming said liquid to a solution containing mainly sodium ferrocyanid and sodium carbonate by first treating with divided metallic iron and, second, with carbon dioxid, to transform sodium hydrate to sodium carbonate, evaporating said solution at a temperature not greatly above 80° C. to the point at which sodium carbonate just commences to separate as crystals, slowly cooling the solution to prevent said separation until the temperature of maximum solubility of the sodium carbonate is attained but not greatly passed and drawing off the liquor from the ferrocyanid crystals which have deposited during said cooling.

7. A method of obtaining substantially pure sodium ferrocyanid crystals consisting in heating a mixture of barium carbonate and carbon in the presence of nitrogen, recovering barium cyanid, cyanamid and hydroxid therefrom by lixiviating the mass with water, precipitating barium carbonate by the addition of sodium carbonate dissolved in water, separating and drying the precipitate, utilizing said precipitate with additional carbon to form further quantities of the first mixture, treating the liquid taken from said precipitate with finely divided metallic iron to transform sodium cyanid to sodium ferrocyanid, transforming sodium hydrate in the liquid to sodium carbonate by the introduction of carbon dioxid, evaporating said solution at a temperature not greatly above 80° C. to the point at which sodium carbonate just commences to separate as crystals, slowly cooling the solution to prevent said separation until the temperature of maximum solubility of the sodium carbonate is attained but not greatly passed, and drawing off the liquor from the ferrocyanid crystals which have deposited during said cooling.

8. A method of obtaining substantially pure sodium ferrocyanid crystals consisting in heating a mixture of barium carbonate and carbon in the presence of nitrogen, recovering barium cyanid, barium cyanamid and barium hydroxid therefrom by lixiviating the mass with water, precipitating barium carbonate by the addition of sodium carbonate dissolved in water, separating the liquid from the mixture, transforming said liquid to a solution containing mainly sodium ferrocyanid and sodium carbonate by first treating with divided metallic iron and, second, with carbon dioxid to transform sodium hydrate to sodium carbonate, evaporating said solution at a temperature not greatly above 80° C. to the point at which sodium carbonate just commences to separate as crystals, slowly cooling the solution to prevent said separation until the temperature of maximum solubility of the sodium carbonate is attained but not greatly passed, drawing off the liquor from the ferrocyanid crystals which have deposited during said cooling and utilizing said liquor in the precipitation of barium carbonate by the addition of sodium carbonate as above in the original solution to recover ferrocyanid which has not been deposited during said cooling.

9. A method of obtaining substantially pure sodium ferrocyanid crystals consisting in heating a mixture of barium carbonate and carbon in the presence of nitrogen, recovering barium cyanid, barium cyanamid and barium hydroxid therefrom by lixiviating the mass with water, precipitating barium carbonate by the addition of sodium carbonate dissolved in water, separating the liquid from the mixture, transforming said liquid to a solution containing mainly sodium ferrocyanid and sodium carbonate by first treating with divided metallic iron and, second, with carbon dioxid to transform sodium hydrate to sodium carbonate, evaporating said solution at a temperature not greatly above 80° C. to the point at which sodium carbonate just commences to separate as crystals, slowly cooling the solution to prevent said separation until the temperature of maximum solubility of the sodium carbonate is attained but not greatly passed, drawing off the liquor from the ferrocyanid crystals which have deposited during said cooling, further cooling said drawn-off liquor to deposit crystals of sodium carbonate and some more sodium ferrocyanid crystals and utilizing said mixed crystals in the preparation of a further quantity of the original solution to precipitate barium carbonate.

10. A method of obtaining substantially pure sodium ferrocyanid crystals consisting in heating a mixture of barium carbonate and carbon in the presence of nitrogen, recovering barium cyanid, barium cyanamid and barium hydroxid therefrom by lixiviating the mass with water, precipitating barium carbonate by the addition of sodium carbonate dissolved in water, separating the liquid from the mixture, transforming said liquid to a solution containing mainly sodium ferrocyanid and sodium carbonate by first treating with divided metallic iron and, second, with carbon dioxid to transform sodium hydrate to sodium carbonate, evaporating said solution at a temperature not greatly above 80° C. to the point at which sodium carbonate just commences to separate as crystals, slowly cooling the solution to prevent said separation until the temperature of maximum solubility of the sodium carbonate is attained but not greatly passed, drawing off the liquor from the ferrocyanid crystals which have deposited during said cooling, further cooling said liquor while crystals of sodium carbonate and sodium ferrocyanid are deposited, withdrawing the liquid from said crystals and utilizing said crystals and said liquid in the preparation of a further quantity of the original solution to precipitate barium carbonate.

11. A method of obtaining substantially pure sodium ferrocyanid crystals consisting in heating a mixture of barium carbonate and carbon in the presence of nitrogen, recovering barium cyanid, barium cyanamid and barium hydroxid therefrom by lixiviating the mass with water, precipitating barium carbonate by the addition of sodium carbonate dissolved in water, separating the liquid from the mixture, transforming said liquid to a solution containing mainly sodium ferrocyanid and sodium carbonate by first treating with divided metallic iron and, second, with carbon dioxid to transform sodium hydrate to sodium carbonate, evaporating said solution at a temperature not greatly above 80° C. to the point at which sodium carbonate just commences to separate as crystals, slowly cooling the solution to prevent said separation until the temperature of maximum solubility of the sodium carbonate is attained but not greatly passed, drawing off the liquor from the ferrocyanid crystals which have deposited during said cooling, further cooling said liquor while crystals of sodium carbonate and sodium ferrocyanid are deposited, withdrawing the liquor from said crystals, treating said liquid to recover nitrogen as ammonia and utilizing the residue consisting mainly of sodium carbonate in the preparation of a further quantity of the original solution to precipitate barium carbonate.

In testimony whereof I have signed my name to this specification.

T. BOBERG.